Patented Mar. 28, 1950

2,501,693

UNITED STATES PATENT OFFICE 2,501,693

HOMOGENEOUS BULK POLYMERIZATION OF ETHYLENIC UNSATURATES IN THE PRESENCE OF DIAZO-THIO-ETHERS

William B. Reynolds, Bartlesville, Okla., and Ernest W. Cotten, deceased, late of Bartlesville, Okla., by Richard K. Harris, administrator, Bartlesville, Okla., assignors to Phillips Petroleum Company, a corporation of Delaware No Drawing. Application February 16, 1948, Serial No. 8,735

13 Claims. (Cl. 260—84.3)

This invention relates to the polymerization of unsaturated organic compounds capable of undergoing an addition polymerization to form high molecular weight polymers. In one of its more specific aspects it relates to the polymerization of an aliphatic conjugated diene hydrocarbon, including substituted derivatives, either alone or in admixture with a monomer copolymerizable therewith to form long chain polymers of the type known as snythetic rubbers. In a still more specific aspect it relates to the polymerization of a butadiene-1,3 hydrocarbon, or of a derivative thereof, such as chloroprene, in a homogeneous system in the presence of an improved initiator for the polymerization reaction. This application is a continuation-in-part of copending application Serial No. 641,866, filed January 17, 1946.

Unsaturated organic compounds capable of undergoing an addition polymerization to form high molecular weight polymers may be advantageously polymerized, in accordance with the present invention, in a homogeneous system. Such unsaturated organic compounds are generally those which contain a methylene group attached by an olefinic double bond to a carbon atom in the structure $CH_2=C<$. Compounds which contain the $CH_2=C<$ group and are suitable as monomers for use in the process of our invention include the following: 1,3-butadiene and its homologues and analogues which polymerize in the same manner, such as isoprene, piperylene, chloroprene, and the like; styrene; acrylonitrile; methyl acrylate; methyl methacrylate; vinyl chloride; etc. These unsaturated organic compounds are given by way of example only. The unsaturated organic compounds may be polymerized alone or in admixture with other monomers copolymerizable therewith.

When the aforementioned materials, either singly or in admixture with other polymerizable substances, are allowed to stand in a closed container, polymerization occurs with the resultant formation of various polymeric products. However, the rate of reaction is generally very slow, a period of several days or even weeks frequently being required to reach complete conversion. While in some instances the presence of oxygen or an oxygen-containing compound such as, for example, benzoyl peroxide or other similar material is known to increase the polymerization rate, the conversion of these unsaturated organic compounds to polymeric products is still a relatively slow process.

A method has now been found whereby the rate of polymerization of polymerizable organic compounds in a homogeneous liquid system is markedly increased and polymeric products of excellent processability are obtained. In accordance with the present invention polymerization is effected in the presence of a small quantity of a diazo thioether, preferably an oil-soluble diazo thioether, which exerts a pronounced accelerating effect on the conversion rate and also serves as a modifier for the polymerization.

An object of this invention is to provide an improved process for the addition polymerization of unsaturated organic compounds to form high molecular weight polymers. Another object is to provide an improved process for the polymerization of aliphatic conjugated diene hydrocarbons. Another object is to provide an improved process for the copolymerization of a butadiene hydrocarbon and a monomer copolymerizable therewith in a homogeneous system. Still another object of this invention is to provide improved initiators or catalysts for use in polymerization reactions of this type. A further object of this invention is to provide compounds particularly suited as initiators and modifiers in homogeneous, or bulk, polymerization of polymerizable organic compounds. A still further object is to provide improved high molecular weight polymers of unsaturated organic monomers. An important object of this invention is to provide a polymerization process in which a novel initiator is employed to effect a reduction in the time required for carrying out polymerization reactions of this type. Further objects and advantages of this invention will become apparent, to one skilled in the art, from the accompanying disclosure and discussion.

The diazo thioethers employed in this invention have the general structural formula R—N=N—S—R' where R is a member of the group consisting of aromatic and substituted aromatic radicals and R' is a member of the group consisting of aromatic, substituted aromatic, cycloalkyl, substituted cycloalkyl, aliphatic, and substituted aliphatic radicals. These compounds, which may be conveniently prepared by diazotizing an aromatic amine and coupling the diazonium compound with an aliphatic or aromatic mercaptan, are more fully described in the previously mentioned application of Reynolds and Cotten, Serial No. 641,866, filed January 17, 1946.

Examples of aromatic amines which may be used in the preparation of the oil soluble diazo thioethers are: aniline, chloroaniline, bromoaniline, toluidine, anisidine, phenetidine, 4-aminodiphenyl ether, dimethoxy aniline, methylmethoxy aniline, trimethyl aniline, dichloroaniline, xylidine, chlorotoluidine, a naphthylamine, dianisidine, benzidine, dichlorobenzidine, etc. Examples of mercaptans that may be used as a coupling component are: thiophenol, thiocresol, chloro thiophenol, methoxy thiophenol, thio-alpha-napthol, thio-beta-naphthol, n-butyl mercaptan, tert-butyl mercaptan, cyclohexyl mercaptan, mercaptobenzothiazole, octyl mercaptan, and the like. Preferably, neither the amine nor the mercaptan will contain more than eighteen carbon atoms per molecule.

The diazo thioethers preferred for use as polymerization catalysts in accordance with the present invention are those in which both R and R' in the foregoing structural formula are aromatic or substituted aromatic groups. Examples of preferred compounds are substituted benzene diazo mercapto-naphthalenes, substituted benzene diazo mercapto-benzenes, substituted naphthalene diazo mercapto-benzenes, and substituted naphthalene diazo mercapto-naphthalenes. Preferred substituent groups are the alkyl, alkoxy, aryloxy (e. g., phenoxy), carboxy, sulfo ($SO_3H$), halo, and nitro groups. Other substituents give diazo thioethers of varying degrees of usefulness.

The diazo thioethers can conveniently be prepared by diazotizing an aromatic amine and coupling the diazonium compound with an aliphatic or an aromatic mercaptan. Diazo thioethers containing two diazo thioether groupings can be prepared by tetrazotizing an aromatic diamine and coupling the tetrazonium compound with two molecular equivalents of a mercaptan. The coupling to the mercaptan is usually carried out in a strongly alkaline medium although in some examples it is advantageous to carry out the coupling in weakly acidic media. The crude diazo thioethers isolated from the coupling are usually of sufficient purity for use in polymerization reactions. However, if a purified product is desired the oil-soluble types may be purified by dissolving in acetone or anhydrous ether at about 10° C., cooling to about —50° C. and filtering off the recrystallized product. The water-soluble type diazo thioethers, in the form of their ammonium or alkali metal salts (resulting from coupling in an alkaline medium), can be conveniently purified by washing with anhydrous ether.

Compounds which are preferred catalysts for the polymerization process of this invention are those represented by the formula

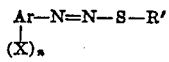

where Ar is an aryl group and X is a substituent selected from the group consisting of alkyl, alkoxy, aryl and aryloxy radicals, $n$ is an integer from one to four, $n$ being at least two when a methyl radical is a substituent; and R' is a member of the group consisting of aromatic, substituted aromatic, cycloalkyl, substituted cycloalkyl, aliphatic, and substituted aliphatic radicals. When a methyl substituent is employed in the aryl group attached to the nitrogen at least one other methyl (or other alkyl), alkoxy, aryl, or aryloxy radical is also present. Specific examples of such compounds are the following: 2-(4 methoxybenzene diazo mercapto)-naphthalene, 2-(4-methylbenzene diazo mercapto)-naphthalene, 2-(2,4-dimethylbenzene diazo mercapto)-naphthalene, 2-(4-chlorobenzene diazo mercapto)-napthalene, 1-(4-methoxybenzene diazo mercapto)-naphthalene, 1-(2,4-dimethylbenzene diazo mercapto)-naphthalene, 2-(4-chlorobenzene diazo mercapto)-2-methyl propane, and the like, together with the ammonium and alkali metal salts of such compounds. Some of the more important new compounds may be conveniently represented by the formula

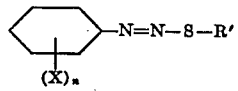

where X is a substituent selected from the group consisting of alkoxy and aryloxy radicals, $n$ is an integer from one to four, and R' is a member of the group consisting of aromatic, substituted aromatic, cycloalkyl, substituted cycloalkyl, aliphatic, and substituted aliphatic radicals.

When operating according to the process of this invention, a polymerizable organic monomeric material, either alone or in admixture with a monomer copolymerizable therewith, is charged to any conventional-type reactor, together with the requisite quantity of diazo thioether, with which it has previously been admixed or, if desired, the diazo thioether may be introduced into the reactor following charging of the polymerizable material. Following the charging procedure the temperature is adjusted to the desired level and the reaction mixture is stirred, or otherwise agitated, until the desired degree of conversion has been attained. In some instances it is preferred to irradiate the reaction mixture with actinic light in order to increase the polymerization rate. When carrying out polymerization reactions according to the process herein described, an inert solvent may be used and in some instances it is preferred to so operate. Among the solvents which are applicable may be mentioned paraffin hydrocarbons, such as a butane, a pentane, or a hexane, cycloparaffins such as cyclohexane, and aromatic hydrocarbons, such as benzene or mixtures of such hydrocarbons or derivatives thereof. The polymer is recovered from the reaction mixture in any suitable manner, e. g., by coagulation with alcohol, by treatment of the reaction mixture with boiling water to remove unreacted monomers, filtration and subsequent drying of the polymer, or by removal of the unreacted monomers at slightly elevated temperatures under vacuum.

The rate of polymerization of polymerizable organic compounds in a homogeneous system, and also the degree of modification of the polymeric product, are controlled in large part by the amount of diazo thioether present. Another factor which affects the conversion rate is the temperature maintained during the polymerization period. The amount of diazo thioether employed will usually range from about 0.05 to about 5.0 per cent by weight, based on the quantity of unsaturated organic material employed. The degree of modification obtained increases as the amount of diazo thioether is increased. Polymerization temperatures will usually vary from about 10 to about 70° C., although lower temperatures are applicable in cases where it is desirable to so operate. In some instances temperatures as low as about —30° C. may be employed. The diazo thioether may be added in increments throughout the polymerization reaction, in order to provide more uniform results and more efficient utilization of the diazo thioether.

The use of diazo thioethers in polymerization reactions of the type herein described represents a definite advance over the art. While catalytic effects have been observed when reactions of this type are carried out in the presence of oxygen, or oxygen-yielding compounds such as peroxides, e. g., benzoyl peroxide, the reaction rate is much more rapid when diazo thioethers are employed. In addition, diazo thioethers also exert a modifying effect on the polymer and a means of controlling polymer properties is thus afforded.

One of the greatest advantages of the use of diazo thioethers in polymerization reactions in accordance with our invention is their great versatility. Diazo thioethers of almost any desired reactivity can be prepared by suitably varying the radicals R and R'. For example, if R and R' are both aromatic radicals, diazo thioethers of great activity can be obtained if either or both of the radicals contain activating substituents, for example, alkyl or alkoxy groups. If low-activity initiators are desired for polymerization reactions at higher temperatures the radicals R and R' can contain deactivating substituents, for example, chloro or nitro groupings. When R' is aliphatic, diazo thioethers of high activity are obtained. Considerable variation in this high activity can be obtained by varying the substituents on the aromatic radical R.

Advantages of this invention are illustrated by the following examples. The reactants, and their proportions, and the other specific ingredients of the recipes, are presented as being typical and should not be construed to limit the invention unduly.

Example I

Two chloroprene polymerizations were carried out simultaneously in homogeneous systems. The same quantity of chloroprene was charged to each of two reactors. Into one reactor was introduced 0.3 per cent 2-(4-methoxybenzene diazo mercapto)-naphthalene while to the other 0.3 per cent benzoyl peroxide was added. The temperature was maintained at 50° C. throughout the polymerization period. The liquid reactants were mildly agitated, the run containing the diazo thioether being allowed to continue for a 12-hour period while that containing the benzoyl peroxide was allowed to react for 16 hours. At the conclusion of the polymerization the polymer was recovered by treating the reaction mixture with boiling water, filtering, and drying the product. A 46 per cent conversion was reached in the diazo thioether run while a conversion of only 25 per cent was obtained in the run containing benzoyl peroxide. The sample containing the diazo thioether was soft and well modified while that in which the benzoyl peroxide was used was tough and difficult to process.

Example II

Chloroprene was polymerized in the presence of 0.15 per cent 2-(4-methoxybenzene diazo mercapto)-naphthalene using the procedure of Example I. The temperature was maintained at 50° C. At the end of a 10-hour period conversion had reached 27 per cent. A parallel run made in the presence of 0.15 per cent benzoyl peroxide gave a 10 per cent conversion.

Example III

The procedure of Example I was followed for the polymerization of chloroprene except that 0.45 per cent 2-(4-methoxybenzene diazo mercapto)-naphthalene was used instead of 0.3 per cent. A 34.5 per cent conversion was reached at the end of a 10-hour reaction period. A similar run carried out with benzoyl peroxide gave a 16 per cent conversion.

Example IV

Two polymerizations are effected in the manner referred to in Example I except that in one case 0.3 per cent 2-(4-methylbenzene diazo mercapto)-naphthalene is added and in the other the same quantity of 2-(2,4-dimethylbenzene diazo mercapto) - naphthalene is employed. When the polymerization temperature is held at 50° C. the results are comparable to that when 2-(4-methoxybenzene diazo mercapto)-naphthalene is used.

Example V

The polymerization of chloroprene is effected in the presence of 0.3 per cent 1-(4-methoxybenzene diazo mercapto)-naphthalene. The procedure followed is the same as that described in Example I. The temperature is maintained at 50° C. throughout the polymerization. At the end of a 10-hour period, the conversion reached is 32 per cent. When a similar reaction is carried out in which the diazo thioether employed is 2-(4-chlorobenzene diazo mercapto)-2-methyl propane, comparable results are obtained.

Example VI

A butadiene-styrene copolymer was prepared from 75 parts butadiene and 25 parts styrene. The reaction was effected at 50° C. in the presence of 2.7 parts 2-(4-methoxybenzene diazo mercapto)-naphthalene. The procedure followed was essentially that described in Example I. A 40 per cent conversion was reached at the conclusion of a 32-hour reaction period.

Example VII

Styrene containing 0.5 per cent 2-(4-methoxybenzene diazo mercapto)-naphthalene is allowed to stand at room temperature in the presence of actinic light. The material polymerizes to a solid mass of polystyrene in five hours.

Example VIII

Methyl methacrylate containing 0.5 per cent 2-(4-methoxybenzene diazo mercapto)-naphthalene is polymerized at 50° C. The material is mildy agitated during the 20-hour reaction period. At the end of this time a solid polymer is formed.

Example IX

A 50 per cent solution of vinyl chloride in benzene is charged to a reactor and 0.5 per cent 2-(4-methoxybenzene diazo mercapto)-naphthalene added. The mixture is agitated 20 hours at a temperature of 50° C. Recovery of the polymer is effected by removal of the solvent and unreacted monomer at a slightly elevated temperature under vacuum.

Example X

Four similar reactors were each charged with chloroprene and 2-(4-methoxybenzene diazo mercapto) naphthalene, referred to as MDN. As indicated in the following table, a different amount of this diazo thioether was used in each reactor. The reaction was conducted, with agitation, at 50° C., and at various intervals samples were secured from the reactors to determine the extent of polymerization of the chloroprene. The data so obtained are presented in the accompany table.

| Sample No | 1 | 2 | 3 | 4 |
|---|---|---|---|---|
| Parts MDN [1] | 0.075 | 0.15 | 0.30 | 0.45 |
| 3.25 hours | | | 17.5 | 21.0 |
| 4.25 hours | 7.9 | 16.4 | | |
| 4.75 hours | | | 21.3 | 25.5 |
| 5.75 hours | 15.4 | 20.0 | | |
| 6.6 hours | | | 25.3 | 29.5 |
| 10.0 hours | 20.3 | 27.0 | 31.4 | 34.5 |

[1] 2-(4-methoxybenzene diazo mercapto)-naphthalene.

It is interesting to note that the conversion curves defined by these data are not linear with respect to time. Over the range 0.15–0.45 part MDN the conversions at a given time are linear functions of the initial concentration of MDN. However, conversions with 0.075 part MDN do not fall on these straight lines and extrapolated values at zero MDN are higher than the previously obtained uncatalyzed rates. Therefore, it must be assumed that the linear relationship holds only over a limited range of catalyst concentrations. The polymers produced with MDN catalysis in these runs appeared to be over-modified.

As will be evident to those skilled in the art, various modifications of this invention can be made, or followed, in the light of the foregoing disclosure and discussion, without departing from the spirit or scope of the disclosure or from the scope of the claims.

What is claimed is:

1. An improved method for producing a synthetic rubber comprising polychloroprene, which comprises polymerizing chloroprene in a liquid homogeneous bulk system at a polymerization temperature between 10 and 50° C. in the presence of 0.05 to 5 per cent by weight of 2-(4-methoxybenzene diazo mercapto)-naphthalene as polymerization catalyst, and recovering an elastic polymeric material as a product of the process.

2. An improved process for the polymerization of chloroprene, which comprises agitating a liquid homogeneous bulk reaction mixture comprising chloroprene at a polymerization temperature between about −30 and about 70° C. and adding to said reaction mixture as a polymerization initiator a methoxybenzene diazo mercapto-naphthalene, and recovering an elastic polymeric material as a product of the process.

3. In a process of polymerizing by addition polymerization an ethylenically unsaturated polymerizable organic compound to form a high molecular weight linear polymer while in a homogeneous bulk fluid reaction mixture, the step which comprises incorporating in such a reaction mixture and effecting said polymerization reaction in the presence of a diazo thioether of the formula R—N=N—S—R' where R is an aromatic radical and R' is selected from the group consisting of aromatic, cycloaliphatic, and aliphatic radicals, and each of R and R' contains not more than eighteen carbon atoms.

4. In a process of polymerizing by addition polymerization an ethylenically unsaturated polymerizable organic compound to form a high molecular weight linear polymer while in a liquid bulk homogeneous reaction mixture to produce an elastic polymer of high molecular weight, the improvement which comprises incorporating in such a reaction mixture and effecting said polymerization reaction in the presence of between 0.05 and 5 per cent by weight of a diazo thioether, of the formula R—N=N—S—R' where R is an aromatic radical and R' is selected from the group consisting of aromatic, cycloaliphatic, and aliphatic radicals, and each of R and R' contains not more than eighteen carbon atoms.

5. The improvement of claim 4 wherein said diazo thioether is a methoxybenzene diazo mercapto-naphthalene.

6. The improvement of claim 4 wherein said diazo thioether is a 4-methoxybenzene diazo mercapto-naphthalene.

7. The improvement of claim 4 wherein said diazo thioether is 2-(4-methoxybenzene diazo mercapto)-naphthalene.

8. The improvement of claim 4 wherein said diazo thioether is 1-(4-methoxybenzene diazo mercapto)-naphthalene.

9. The improvement of claim 4 wherein said polymerizable ethylenically unsaturated organic compound is chloroprene and said diazo thioether is a methoxybenzene diazo mercapto-naphthalene.

10. The improvement of claim 4 wherein said polymerizable ethylenically unsaturated organic compound is 1,3-butadiene and said diazo thioether is a methoxybenzene diazo mercapto-naphthalene.

11. The improvement of claim 4 wherein a mixture of butadiene and styrene are copolymerized and said diazo thioether is a methoxybenzene diazo mercapto-naphthalene.

12. The improvement of claim 4 wherein said diazo thioether is a chlorobenzene diazo mercapto-paraffin.

13. The improvement of claim 4 wherein said diazo thioether is 2-(4-chlorobenzene diazo mercapto)-2-methylpropane.

WILLIAM B. REYNOLDS.
RICHARD K. HARRIS,
Administrator of the Estate of Ernest W. Cotten, Deceased.

No references cited.